United States Patent

Schopf

(10) Patent No.: US 9,062,956 B2
(45) Date of Patent: Jun. 23, 2015

(54) PROBE HEAD

(75) Inventor: Reinhold Schopf, Trostberg (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 395 days.

(21) Appl. No.: 13/545,268

(22) Filed: Jul. 10, 2012

(65) Prior Publication Data

US 2013/0027026 A1    Jan. 31, 2013

(30) Foreign Application Priority Data

Jul. 25, 2011   (DE) .......................... 10 2011 079 738

(51) Int. Cl.
*G01B 5/012*     (2006.01)
*G01B 21/04*     (2006.01)

(52) U.S. Cl.
CPC .............. *G01B 5/012* (2013.01); *G01B 21/047* (2013.01)

(58) Field of Classification Search
CPC .................................. G01R 1/07; G01B 5/012
USPC ............................................ 33/559, 560, 561
See application file for complete search history.

(56) References Cited

U.S. PATENT DOCUMENTS

| 3,869,799 | A |   | 3/1975  | Neuer et al. |        |
|-----------|---|---|---------|--------------|--------|
| 4,720,922 | A |   | 1/1988  | Strauss      | 33/359 |
| 5,090,131 | A | * | 2/1992  | Deer         | 33/556 |
| 5,435,072 | A | * | 7/1995  | Lloyd et al. | 33/559 |
| 5,806,201 | A | * | 9/1998  | Feichtinger  | 33/561 |
| 5,918,378 | A | * | 7/1999  | McMurtry et al. | 33/556 |
| RE37,030  | E | * | 1/2001  | Lloyd et al. | 33/559 |
| 7,202,680 | B2 | * | 4/2007 | Madlener et al. | 33/558 |
| 7,392,596 | B2 | * | 7/2008 | Schopf       | 33/559 |
| 7,603,789 | B2 | * | 10/2009 | Hellier et al. | 33/561 |
| 8,082,674 | B2 | * | 12/2011 | Jordil et al. | 33/558 |
| 2006/0197541 | A1 | * | 9/2006 | Madlener et al. | 324/691 |
| 2007/0062057 | A1 | * | 3/2007 | Schopf      | 33/561 |
| 2013/0027026 | A1 | * | 1/2013 | Schopf      | 324/149 |
| 2013/0298416 | A1 | * | 11/2013 | Collingwood et al. | 33/503 |

FOREIGN PATENT DOCUMENTS

| DE | 2 242 355     | 3/1974  |
| DE | 35 32 184     | 2/1987  |
| DE | 38 04 111     | 8/1989  |
| DE | 196 22 987    | 12/1997 |
| DE | 10 2004 016 714 | 10/2005 |

OTHER PUBLICATIONS

European Search Report, dated Oct. 26, 2012, issued in corresponding European Patent Application No. 12165389.3.

\* cited by examiner

*Primary Examiner* — Yaritza Guadalupe-McCall
(74) *Attorney, Agent, or Firm* — Kenyon & Kenyon LLP

(57) ABSTRACT

A probe head includes a housing having a first housing unit to be affixed on a machine, and a second housing unit on which a stylus is supported so as to be deflectable. The second housing unit is movably supported on the first housing unit so as to allow a deflection. The probe head furthermore has a switching unit, which includes a first contact element and a second contact element, the contact elements being arranged such that when the second housing unit is deflected relative to the first housing unit, the contact elements are able to be brought into mutual contact at different points as a function of the direction of deflection, whereby an electrical switching signal is able to be triggered by this contact.

11 Claims, 4 Drawing Sheets

PROBE HEAD

CROSS-REFERENCE TO RELATED APPLICATIONS

The present application claims priority to Application No. 10 2011 079 738.6, filed in the Federal Republic of Germany on Jul. 25, 2011, which is expressly incorporated herein in its entirety by reference thereto.

FIELD OF THE INVENTION

The present invention relates to a probe head, which may be operated in a reliable and robust manner.

BACKGROUND INFORMATION

Probe systems, for example, are used for determining the position of workpieces which are clamped into material-working machines such as milling machines, for example. These probe systems frequently have a stationary transceiver unit, which is mounted on a permanently installed portion of the material-working machine, and they have a part which is movable or mobile with respect to the latter and often called a probe head. The probe head is often mounted on a movable portion of the material-working machine, such as on a milling spindle. The probe head includes a stylus, which is deflectable out of a rest position, or a deflectable probe element, which produces a switching signal when deflected out of its rest position. The rest position of the probe element should be understood to be a position in which the probe element does not have any contact with a workpiece. When the probe element makes contact with the workpiece, the probe element is deflected out of its rest position.

German Patent No. 35 32 184, for example, describes a probe head, for which a collision guard device is produced by a centered support and a single switch, which is offset from the center axis.

SUMMARY

Example embodiments of the present invention provide a probe head which is insensitive to collisions of the housing and which nevertheless achieves an extremely high measuring accuracy.

According to example embodiments of the present invention, a probe head includes a housing and a stylus, and the housing has a first housing unit having a longitudinal axis. This first housing unit is meant to be affixed on a machine, for example. In addition, the housing has a second housing unit, on which the stylus is supported in deflectable manner. When the stylus is deflected relative to the second housing unit, a sensor unit is able to trigger an electrical signal. Furthermore, the second housing unit is movably supported on the first housing unit so as to allow a deflection. The probe head additionally includes a switching unit provided with a first contact element and a second contact element, the contact elements being arranged such that when the second housing unit is deflected relative to the first housing unit, the contact elements are able to be brought into mutual contact, or touching contact, at different points or locations as a function of the direction of deflection. This mechanical and electrical contact makes it possible to trigger an electrical switching signal.

A deflection usually occurs when the housing, for example, the second housing unit, collides with an obstacle. The switching signal may then trigger a stop of the machine on which the first housing unit is affixable, thereby preventing damage of the probe head.

In a condition in which the second housing unit is not deflected relative to the first housing unit, the contact elements may be separated from each other by an axial air gap. This state represents the normal operation of the probe head, that is to say, when no collision is taking place.

At least one of the contact elements may be axially elastic, which means that this contact element elastically deformable, or flexible, along the longitudinal axis.

One of the contact elements may be arranged as a spring, e.g., as a steel, plastic, or rubber spring. In the case of plastic or rubber springs, an electrical conductor or an electrically conductive layer may be provided for the electrical contacting with the other contact element. One of the contact elements may be arranged as a cylindrical or conical helical spring, for example.

At least one contact element, for example, may be arranged as a plate or a disk, which is electrically conductive itself or which includes a conductor or an electrically conductive surface. At least one contact element may be provided with a planar surface, which has an orthogonal orientation with respect to the longitudinal axis.

Both contact elements may have a planar surface, so that these planar surfaces are separated from each other by an axial air gap in a condition in which the second housing unit is not deflected relative to the first housing unit. For example, the first contact element may be arranged as a plate, a disk, or an annular disk, so that this first contact element has a planar surface or end face, especially at its axial end. The second contact element may be arranged as a helical spring, whose end lying across from the first contact element has a planar configuration.

Furthermore, the contact elements may be arranged and placed such that the various points or locations at which the mutual contact of the contact elements is able to occur have the same distance from the longitudinal axis. The points, for example, may be arranged in symmetry with the longitudinal axis.

The probe head may be configured such that one of the contact elements is arranged as spring, whose axis coincides with the longitudinal axis of the first housing unit. This means that the axis and the longitudinal axis are located on top of each other, at the same location. This placement is considered advantageous especially when cylindrical or conical helical springs are used as contact elements.

The probe head may have a switch, and the probe head may be configured to allow a command to be generated when the switching unit or the switch is operated, this command triggering the same reaction of the machine. Such a machine reaction may be a stop of the machine, for example. In other words, the switch and the switching unit are able to generate a command which has the same information content.

Furthermore, the probe head may have a switch, and in a state in which the second housing unit is not deflected in relation to the first housing unit and in which the first housing unit is affixed on a machine, both the switch and the switching unit are open, so that a current flow through the switch and through the switching unit is interrupted.

Further features and aspects of example embodiments of the present invention are described in more detail below with reference to the appended Figures.

DETAILED DESCRIPTION

Figure 1:
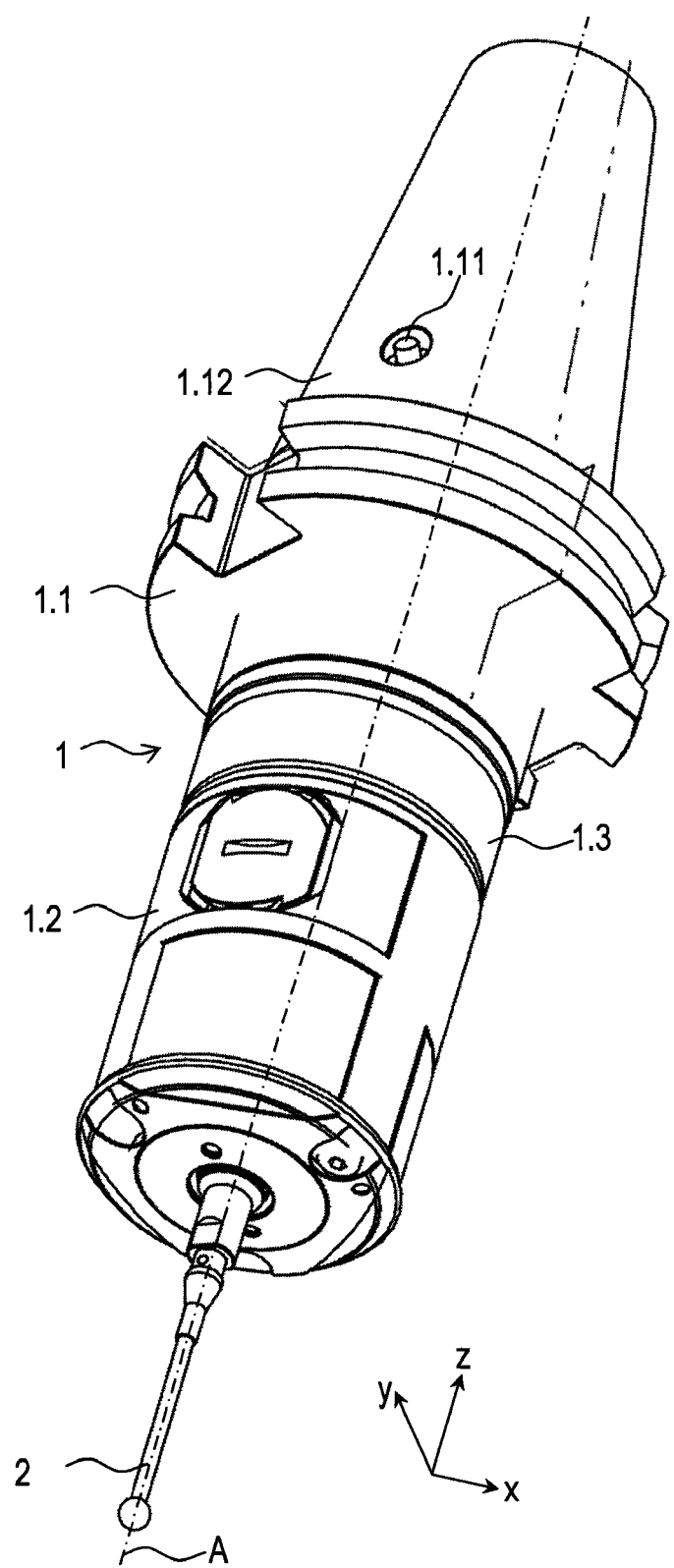
FIG. 1 is a perspective view of a probe head.

FIG. 1 shows a probe head in a perspective exterior view. Accordingly, the probe head includes a housing 1, which has a first housing unit 1.1 and a second housing unit 1.2, the second housing unit 1.2 being movably supported on first housing unit 1.1 in a manner allowing deflection.

First housing unit 1.1 has a conical region 1.12, which is able to be introduced into a chuck of a machine tool. In addition, a switch 1.11, by which it is ensured that the battery-operated probe head is switched off when not clamped in, is disposed in conical region 1.12.

A stylus 2 projects from second housing unit 1.2. Stylus 2 has a longitudinal axis, which in the rest state or in the rest position, simultaneously constitutes longitudinal axis A of housing 1, in particular of second housing unit 1.2.

A deformable sleeve 1.3 made of rubber is provided in the region between first housing unit 1.1 and second housing unit 1.2, for protection from environmental influences.

Figure 2:
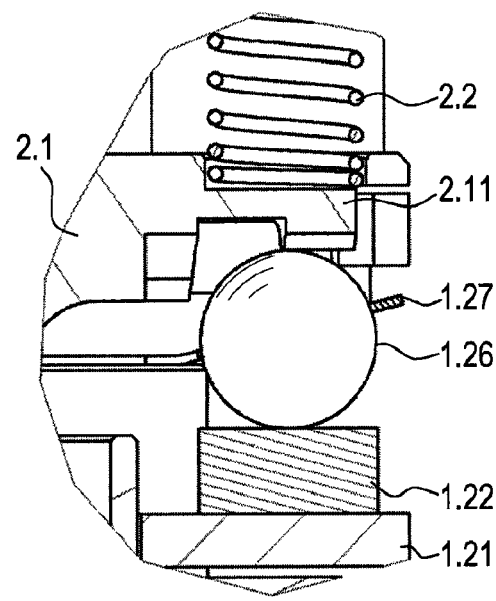
FIG. 2 is an enlarged view of the measuring device of the probe head.

FIG. 2 shows a measuring device, as it is situated in the interior of second housing unit 1.2 of housing 1. In the exemplary embodiment illustrated, stylus 2 has a stylus holder 2.1, which is detachably connected to stylus 2 by a screwed connection. At one end, stylus holder 2.1 of stylus 2 has three arms 2.11 which are disposed at a 120° offset, FIG. 2 showing only one of arms 2.11. In addition, a circuit board 1.21, on which three sensors 1.22 are mounted, of which only one is shown in FIG. 2, are located in second housing unit 1.2. In the exemplary embodiment illustrated, pressure sensor elements which are based on piezoresistive silicon chips are used as sensors 1.22. These sensors 1.22 have a pressure-sensitive surface, on which pn-insulated bridge resistors are arranged. When the probe head is in operation, a supply voltage for the supply of sensors 1.22 is provided via circuit board 1.21. Spheres 1.26, which are used as mechanical transmission elements, rest on the surface of each sensor 1.22. To ensure that spheres 1.26 are always in the correct position relative to sensors 1.22, a holding element 1.27 is provided, which is immovably fixed in place with respect to sensors 1.22.

Stylus holder 2.1 of stylus 2 is supported in second housing unit 1.2 of the probe head in centered manner. Prestressed by springs 2.2, arms 2.11 of stylus holder 2.1 are resting on spheres 1.26; stylus holder 2.1 is movably supported relative to second housing unit 1.2, and thus is movable or deflectable also relative to sensors 1.22.

As soon as the probe sphere (see FIG. 1, at the lower end of stylus 2) on stylus 2 touches a workpiece to be measured, pressure forces, or changed pressure forces, are initially introduced into associated sphere 1.26, which then transmits corresponding pressure forces to associated sensor 1.22. Each sensor 1.22 generates a corresponding level change in its electrical signals. The signals are conditioned further, and if prespecified criteria are satisfied, an electrical signal is generated. The deflected or switching position is reached before one of arms 2.11 of stylus 2 loses mechanical contact with the respective sphere 1.26. This prevents the creation of a direction-dependent switching characteristic. The appropriate electrical signals are converted into electromagnetic signals, which are transmitted to a stationary receiving station. The stationary receiving station is fixed in place on an immobile component of the machine tool, for example. From this stationary receiving station, the received signal is forwarded to an electronic system, for example, in the control system of the machine tool, where the position of the probe sphere is determined and the machine is stopped at the same time.

When the probe head is moved out of the stop position, stylus 2 returns to the rest position. Holding element 1.27 ensures that spheres 1.26 rest reproducibly at the correct point on the surface of sensors 1.22, once stylus 2 returns from the stop position to the rest position.

Figure 4:
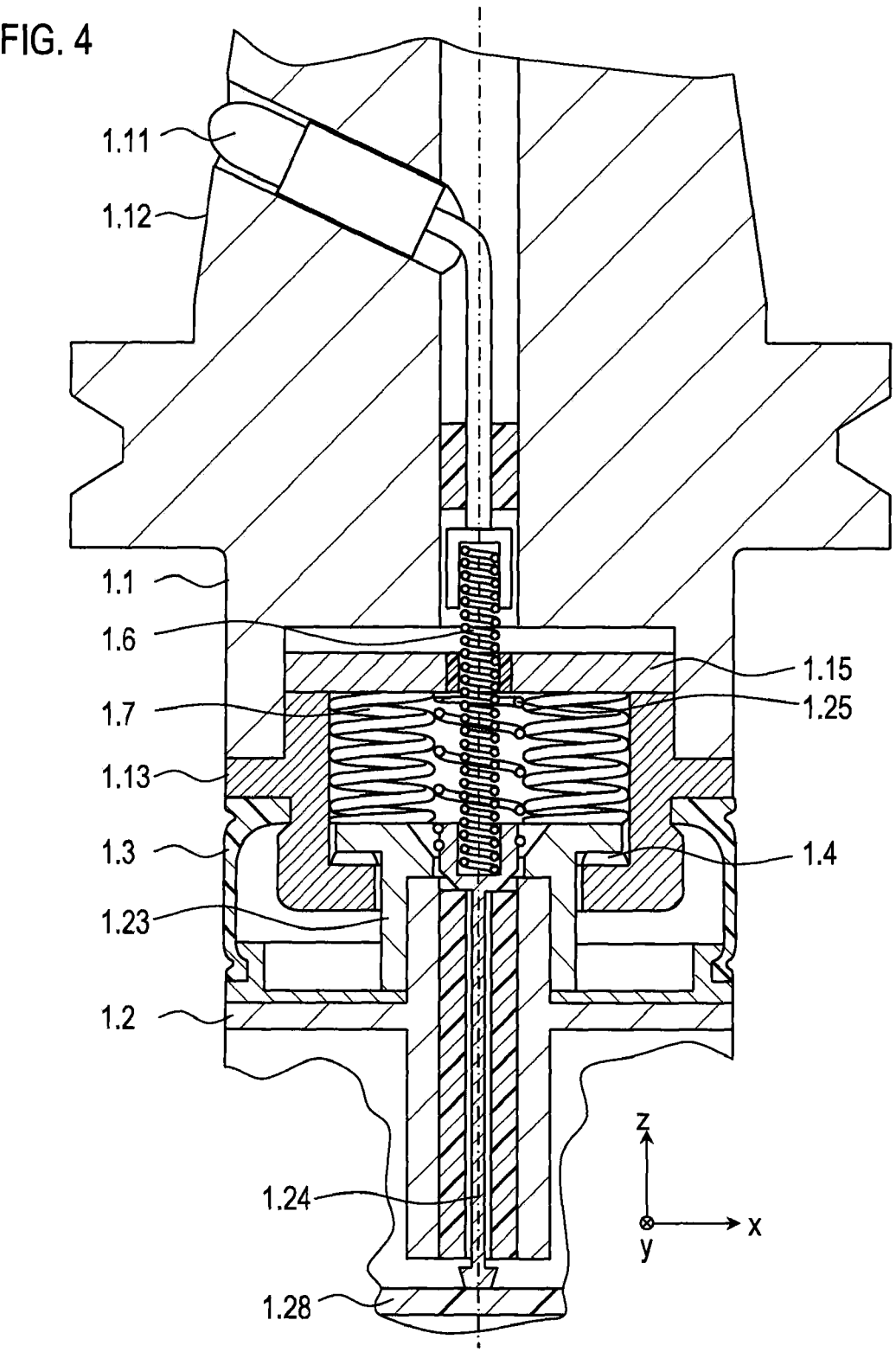
FIG. 4 is a partial cross-sectional view of the probe head.

FIG. 4 shows a partial cross-sectional view through the probe head. A switch 1.11 is located in conical region 1.12 of first housing unit 1.1. Switch 1.11 has a round end, which projects from the conical contour of region 1.12 when the probe head is not inserted into a mating component of a machine, e.g., a spindle of a machine tool. In this state, the position of switch 1.11 is closed. Via a cable, which is fixed in place on a helical spring 1.6 in electrically conductive manner, and a mandrel 1.24, one contact of switch 1.11 is connected to a circuit track on a circuit board 1.28. This ensures that the probe head is not being operated as long as switch 1.11 is closed. As soon as the probe head is inserted into the proper mating component of a machine, however, the flexibly supported end is pressed into the bore hole of region 1.12 and switch 1.11 is opened, so that the probe head is operable.

In the course of a measuring operation, it cannot be ruled out that housing 1 inadvertently collides with, for example, an edge of the object to be measured. To avoid damage to the probe head in such a case, second housing unit 1.2 is movably supported on first housing unit 1.1 in a manner that allows deflection. The support includes a first sleeve 1.13, which is assignable to first housing unit 1.1, and a second sleeve 1.23, which belongs to second housing unit 1.2. Spheres 1.4 are arranged between sleeves 1.13, 1.23.

Figure 3:
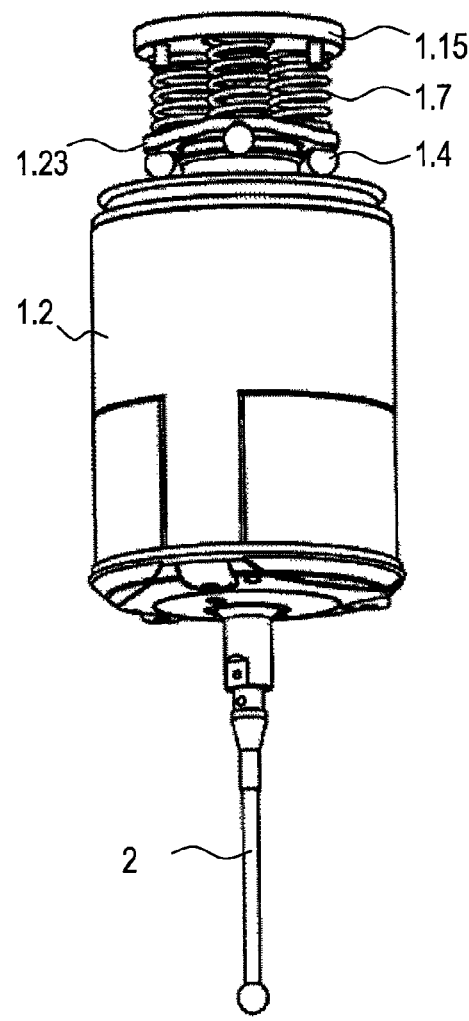
FIG. 3 is a perspective detail view of a support between a second and a first housing unit, the first housing unit being open.
Figure 7:
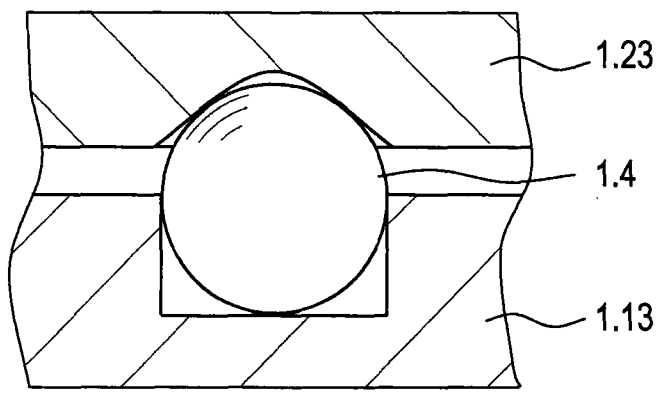
FIG. 7 is an enlarged cross-sectional view of the support between the second and first housing units.

FIG. 7 is a cross-sectional view of the support, e.g., a section through sleeves 1.13, 1.23 in the region of a sphere 1.4. Accordingly, sphere 1.4 is press-fitted into a bore hole of sleeve 1.13, which is part of first housing unit 1.1. Sphere 1.4 is located diametrically opposed in a recess of other sleeve 1.23, which is assigned to second housing unit 1.2. Sphere 1.4 touches sleeve 1.23 of second housing unit 1.2 only at two points. As illustrated in FIGS. 3 and 4, sleeve 1.23 of second housing unit 1.2 is pressed against spheres 1.4 with the aid of helical springs 1.7. One end of a helical spring 1.7 is in contact with sleeve 1.23 in each case, and the other end of said helical spring 1.7 presses against a substantially annular first contact element 1.15, which has a planar surface as axial delimitation. First contact element 1.15 is a component of a switching unit 1.5 whose electrical function is described below. This configuration ensures that the two housing units 1.1, 1.2 are always correctly positioned with respect to each other during normal operation. Especially the initial position is able to be resumed in exact and reproducible manner following a deflection of second housing unit 1.2 relative to first housing unit 1.1.

Figure 6:
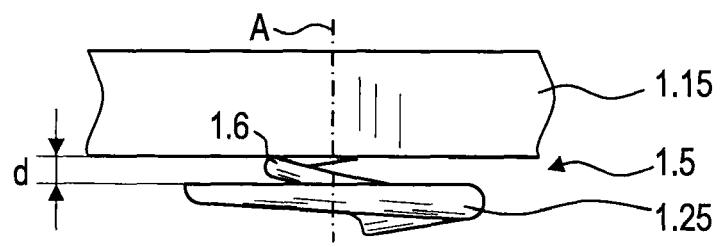
FIG. 6 is an enlarged lateral view of contact elements.

Furthermore, a second contact element 1.25 in the form of a helical spring is arranged within housing 1 as an additional component of switching unit 1.5, an axial end of this helical spring having a planar surface. FIG. 6 illustrates switching unit 1.5 together with its contact elements 1.15, 1.25 in a partial view that is enlarged compared to FIG. 4, in a state in which second housing unit 1.2 is not deflected relative to first housing unit 1.1. In this state, e.g., during normal operation, the two contact elements 1.15, 1.25 and the planar surfaces of contact elements 1.15, 1.25 are separated from each other in the axial direction by an air gap d, which means that this position corresponds to an open switch position of switching unit 1.5. As a result, no current is able to flow between circuit board 1.28 and first housing unit 1.1. Switch 1.11 is electrically switched in parallel with switching unit 1.5 and contact elements 1.15, 1.25, so that the probe head triggers a stop of the machine, e.g., an end of the movement process of the probe head, either when switch 1.11 is closed, for example, the probe head is removed from the machine tool, or when contact elements 1.15, 1.25 touch each other.

Such touching of contact elements 1.15, 1.25 may take place when second housing unit 1.2 is deflected relative to first housing unit 1.1, e.g., when second housing unit 1.2 collides with an object within the processing space of a machine tool, for example.

Figure 5:
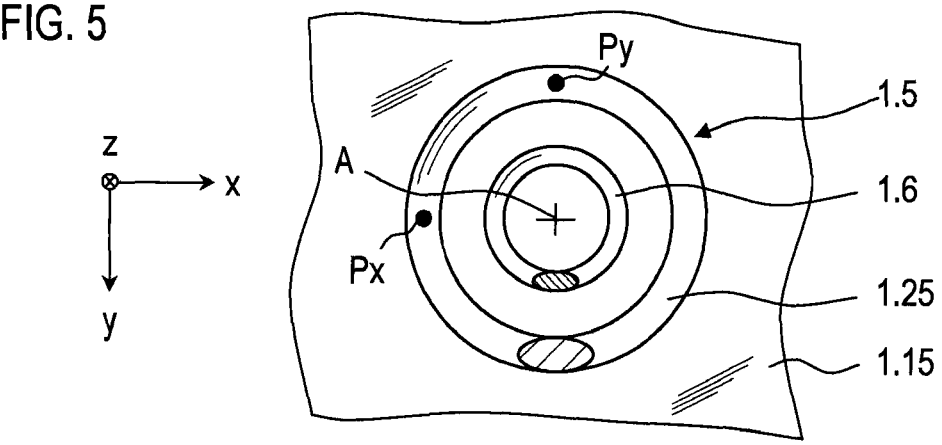
FIG. 5 is an enlarged plan view of contact elements.

FIG. 5 shows a view of second contact element 1.25 (in relation to FIG. 4, FIG. 5 represents a partial view from below). Helical spring 1.6 is arranged radially inside first contact element 1.15. Moving the probe head in the x-direction may cause second housing unit 1.2 to collide with an obstacle. This will induce a corresponding deflection of second housing unit 1.2 relative to first housing unit 1.1 while deforming sleeve 1.3, e.g., such that second axially elastic contact element 1.25 touches first contact element 1.15 at a point Px, while axially compressing second contact element 1.25. This touch triggers a switching signal, and the movement of the machine, and thus of the probe head as well, is stopped. An analogous analysis is possible in the event, for example, that the probe head is moved in the y-direction, and second contact element 1.25 then is touched by first contact element 1.15 at a point Py. These points Px and Py differ in regard to their position, but have the same distance from longitudinal axis A. If a deflection of second housing unit 1.2 in relation to first housing unit 1.1 takes place in the z-direction, then multiple points are touched along a circumferential line.

What is claimed is:

1. A probe head, comprising
a stylus; and
a housing including a first housing unit and a second housing unit movably supported on the first housing unit, the first housing unit having a longitudinal axis and adapted to be affixed on a machine, the stylus deflectably supported on the second housing unit;
a sensor unit adapted to output an electrical signal in response to a deflection of the stylus relative to the second housing unit; and
a switching unit including a first contact element and a second contact element, the contact elements adapted to be brought into mutual contact at different contact points as a function of a direction of deflection of the second housing unit relative to the first housing unit, to trigger an electrical switching signal.

2. The probe head according to claim 1, wherein the contact elements are separated from each other by an axial air gap in a condition in which the second housing unit is not deflected relative to the first housing unit.

3. The probe head according to claim 1, wherein one of the contact elements is axially elastic.

4. The probe head according to claim 1, wherein one of the contact elements includes a spring.

5. The probe head according to claim 1, wherein one of the contact elements includes a helical spring.

6. The probe head according to claim 1, wherein the different contact points are located at an equal distance from the longitudinal axis.

7. The probe head according to claim 1, wherein each contact element includes a planar surface, the planar surfaces separated from each other by an axial air gap in a condition in which the second housing unit is not deflected relative to the first housing unit.

8. The probe head according to claim 1, wherein one of the contact elements includes a helical spring, having an axis that coincides with the longitudinal axis of the first housing unit.

9. The probe head according to claim 1, further comprising a switch, the probe head adapted to allow a command, that triggers a common reaction of the machine, to be generated when the switching unit and/or the switch is operated.

10. The probe head according to claim 9, wherein the reaction of the machine includes a stop of the machine.

11. The probe head according to claim 1, further comprising a switch, the switch and the switching unit adapted to be open to interrupt a current flow in a condition in which the second housing unit is not deflected relative to the first housing unit and in which the first housing unit is affixed on the machine.

\* \* \* \* \*